United States Patent [19]

Tarumi et al.

[11] 4,143,017

[45] Mar. 6, 1979

[54] PROCESS OF PRODUCING SOFT CONTACT LENSES

[75] Inventors: Niro Tarumi, Tokyo; Makoto Tuchiya, Musashino, both of Japan

[73] Assignee: Hoya Lens Corporation, Tokyo, Japan

[21] Appl. No.: 771,932

[22] Filed: Feb. 25, 1977

[30] Foreign Application Priority Data

Feb. 25, 1976 [JP] Japan ................................. 51-19652

[51] Int. Cl.$^2$ ..................... C08F 18/24; C08F 216/02
[52] U.S. Cl. ........................ 260/29.7 H; 260/29.7 T; 264/1; 351/160 H; 526/317; 526/320; 526/321; 526/325
[58] Field of Search .............. 526/317, 320, 321, 325; 260/29.7 T, 29.7 H; 264/1; 351/160

[56] References Cited

U.S. PATENT DOCUMENTS

| 3,317,450 | 5/1967 | Grenley et al. ............... 260/29.7 H |
| 3,892,721 | 7/1975 | Gustafson ........................ 526/320 |
| 3,988,274 | 10/1976 | Masuhara et al. ............. 260/29.7 H |
| 3,992,563 | 11/1976 | Tanaka ............................. 526/320 |
| 4,028,295 | 7/1977 | Loshaek ........................... 526/320 |

FOREIGN PATENT DOCUMENTS 2020329 12/1970 Fed. Rep. of Germany ..... 260/29.7 H

*Primary Examiner*—Melvyn I. Marquis
*Attorney, Agent, or Firm*—Jay L. Chaskin

[57] ABSTRACT

A soft contact lens having a water content of 20 to 45% and a tensile strength of at least 500 g/mm$^2$ can be produced by pouring into a mold a composition comprising 70 to 90% by weight of an alkylene glycol monomethacrylate, 0 to 2% by weight of a polyfunctional monomer as a crosslinking agent, 0 to 5% by weight of an unsaturated carboxylic acid containing at least one carboxyl group in its molecule, 2 to 25% by weight of a methacrylic acid ester and 0 to 10% by weight of a vinyl monomer such as vinyl acetate, effecting polymerization of the composition, processing the resulting polymer into a lens, and then hydrating and swelling the lens thus obtained.

31 Claims, No Drawings

PROCESS OF PRODUCING SOFT CONTACT LENSES

The present invention relates to soft contact lenses and a process for producing the same. More particularly, the invention pertains to soft contact lenses having a low water content, a high tensile strength and excellent stability and a process for producing the same.

It is universally admitted that soft contact lenses are superior to hard contact lenses in many respects and the number of those who wear the soft contact lenses is rapidly increasing in recent years. The advantages of soft contact lenses are exemplified by softness, adaptability to the eyes and oxygen permeability. The water content of prior art soft contact lenses is within a wide range of 20 to 80%. The water content used herein is calculated according to the following equation:

$$\text{Water content} = \frac{\text{hydrated weight - dry weight}}{\text{hydrated weight}} \times 100\%$$

The prior art soft contact lenses are diverse in design. The lenses having a high water content are excellent in adaptability to the eyes, oxygen permeability and medicines adsorbing property and have generally been considered to be comfortable to wear. However, the lenses having a high water content have defects in that their strength is low, it is difficult to obtain the desired lenses on processing owing to their high degree of swelling, a change in dimensions such as base curve and diameter is easy to occur according to a change in external conditions such as humidity, osmotic pressure and pH, and the lenses adsorb protein and lipoid contained in tears owing to their excellent adsorbing property and thereby are liable to be soiled. The lenses having excellent adsorbing property are very useful for carrying out an ophthalmic treatment by letting the lens adsorb a medicine, but are not necessarily satisfactory for correcting ametropia in dimensional stability and durability. Under these circumstances, it is considered that soft contact lenses should be classified according to the object of their use into (1) lenses for ophthalmic treatment which have a high water content and (2) lenses for correcting ametropia which have a low water content, durability, excellent ability to correct ametropia, a high strength and excellent dimensional stability. In the case of lenses for correcting ametropia, their ability to correct ametropia must be of course excellent but their excellent durability is also an essential requisite. As for durability, the prior art lenses are easily damaged owing to their poor strength or a secretion from the eyes is deposited on the surface of the lenses. By boiling the secretion, the degeneration of protein occurs and the lenses become white turbid or are yellowed or are deformed as the case may be. A reason therefor is considered to be the fact that the lenses have a high water content. However, the degree of soil varies in some cases according to the composition of the lenses.

The present inventors previously accomplished the invention of U.S. Pat. No. 3,988,274 relating to a soft contact lens having a water content of at least 45% and a tensile strength of at least 100 g/mm² as produced by pouring into a mold a composition comprising 70 to 93% by weight of an alkylene glycol monoacrylate or monoethacrylate, 0.3 to 2.0% by weight of a polyfunctional monomer, 1 to 10% by weight of a monomer having at least one carboxyl group in its molecule and 5 to 20% by weight of an acrylic or methacrylic acid derivative, raising the temperature of the composition from 35° to 110° C. continuously to effect polymerization, processing the resulting formed product into a lens, and then swelling the lens thus obtained by hydration treatment including alkali treatment.

It is the principal object of the present invention is to provide soft contact lenses having a low water content, comfortableness to wear, excellent durability, high dimensional stability, a high tensile strength and soil resistance.

It is another object of the invention is to provide a process of producing such soft contact lenses.

These and other objects and advantages of the invention will be apparent from the following description of the invention.

As a result of various studies for developing the above-mentioned soft contact lenses, the present inventors have now completed the present invention.

According to the present invention, there is provided a soft contact lens having a water content of 20 to 45% and a tensile strength of at least 500 g/mm² and consisting of a copolymer of 70 to 90% by weight of an alkylene glycol monomethacrylate, 0 to 2% by weight of a polyfunctional monomer as a crosslinking agent, 0 to 5% by weight of an unsaturated carboxylic acid containing at least one carboxyl group in its molecule, 2 to 25% by weight of a methacrylic acid ester and 0 to 10% by weight of a vinyl monomer.

The base material for the soft contact lenses according to the present invention comprises 70 to 90% by weight of an alkylene glycol monomethacrylic, 0 to 2% by weight of a polyfunctional monomer as a crosslinking agent, 0 to 5% by weight of an unsaturated carboxylic acid containing at least one carboxyl group in its molecule, 2 to 25% by weight of a methacrylic acid ester and 0 to 10% by weight of a vinyl monomer, and can be obtained by adding a usual radical polymerization catalyst to a mixture of these components, mixing uniformly, and then subjecting the mixture to casting polymerization through a method of continually increasing the temperature from 35° C. to 110° C.

More particularly, the alkylene glycol monomethacrylates represented by the formula,

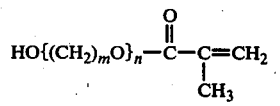

wherein m is 2, 3 or 4 and n is 1, 2, 3, ... or 1000, which may be used in the present invention, are exemplified by monomethacrylates of ethylene glycol, propylene glycol, diethylene glycol, tetraethylene glycol and polyethylene glycol [HO(CH₂CH₂O)$_n$H, n = 5-1000]. Any one of the alkylene glycol monomethacrylates may be used as the main component of the base material for the soft contact lenses of the present invention. Ethylene glycol monomethacrylate (2-HEMA) is a representative example thereof.

The polyfunctional monomers which may be used as a crosslinking agent in the present invention are exemplified by ethylene glycol dimethacrylate, diethylene glycol dimethacrylate, triethylene glycol dimethacrylate, tetraethylene glycol dimethacrylate, polyethylene glycol dimethacrylate represented by the formula,

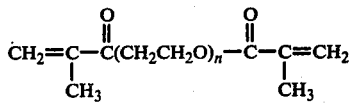

wherein n is 5 to 23, butylene glycol dimethacrylate, neopentyl glycol dimethacrylate of the formula,

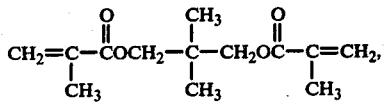

propylene glycol dimethacrylate and diethylene glycol bisallylcarbonate of the formula,

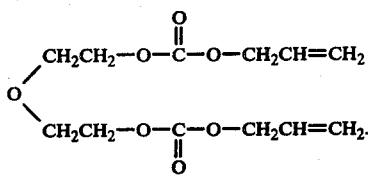

It is not always necessary to add these polyfunctional monomers, but the monomers are preferably added to effect the stabilization of the lens by forming a three-dimensional structure.

Also, the unsaturated carboxylic acids having at least one carboxyl group in their molecule which may be used in the present invention are exemplified by acrylic acid, methacrylic acid and itaconic acid, but are not limited to these compounds so long as the above-mentioned conditions are satisfied. This component serves to increase the water content of the soft contact lenses and has the effect of affording elasticity to the lenses.

The methacrylic acid esters which may be used in the present invention include methyl methacrylate, ethyl methacrylate, n-propyl methacrylate, n-butyl methacrylate and n-hexyl methacrylate. These methacrylic acid esters reduce the water content and simultaneously serve to increase the strength and afford elasticity. As said vinyl monomers, for example, vinyl acetate is used. The vinyl monomers have a similar effect to that of the methacrylic acid esters and are particularly effective in affording elasticity.

Further, as the radical polymerization catalyst, benzoyl peroxide, lauroyl peroxide, cumene hydroperoxide, di-tert-butyl peroxide, bis-4-tert-butylcyclohexyl peroxydicarbonate, diisopropyl peroxydicarbonate and azobisisobutyronitrile may be used.

In the present invention, these respective components are mixed and the mixture is poured into a metal, glass or plastic mold. The polymerization is then completed by increasing the temperature of the mixture from 35° C. to 110° C. continuously in an electric oven. In general, the polymerization has heretofore been carried out by increasing the temperature in stages, but the continuous temperature increasing method is more suitable for producing a uniform polymer. After the completion of the polymerization, the molded product is removed from the mold and finished into a lens by the usual lathe cutting, grinding and polishing process.

As a method for hydrating and swelling the resulting hard lens by immersing it in a hydrating solution, the lens is immersed in normal saline solution (pH 8.0 to 12.0) containing sodium carbonate, potassium carbonate, lithium carbonate, sodium hydrogen carbonate or potassium hydrogen carbonate at room temperature or at a higher temperature. Thereafter, the lens is immersed in 0.9% normal saline solution and allowed to stand at room temperature, or hydration is effected by warming and renewing the normal saline solution several times. Alternatively, the lens may be first treated with normal saline solution, treated with an alkaline solution and then treated with normal saline solution again. When the unsaturated carboxylic acid containing at least one carboxyl group in its molecule is not used, however, it is possible to effect hydration merely by treating with normal saline solution without treating with an alkaline solution.

The characteristics of the soft contact lenses according to the present invention will be described below.

The water content of the soft contact lenses according to the present invention is 20 to 45%. If the water content is more than 45%, the degree of swelling becomes high, the lenses having a desired dimension are difficult to obtain, and the resulting lenses are inferior in strength to the lenses having a water content of 45% or less. Also, if the water content is less than 20%, it is impossible to obtain the lenses having softness and elasticity which are essential characteristics of soft contact lenses. Therefore, it is preferable for soft contact lenses for correcting ametropia to have a water content of 20 to 45%. In the present invention, the lens having any water content of 20 to 45% can be easily obtained by selecting a suitable composition.

In general, the strength of soft contact lenses increases with a reduction in the water content. There is the possibility that soft contact lenses having a low strength are broken during handling, and the washing of the lenses can not be effected satisfactorily in some cases. Therefore, it is an essential requisite for soft contact lenses that the lenses are never broken by usual handling. The soft contact lenses according to the present invention are characterized in that the lenses have softness, elasticity and a tensile strength of 500 g/mm$^2$ or more. It is also possible to produce soft contact lenses having a strength of 900 g/mm$^2$ or more by selecting a suitable composition. This strength is about 6 to 10 times as high as that of ethylene glycol monomethacrylate (2-HEMA) homopolymer. If the lenses have a strength of 500 g/mm$^2$, the lenses are not broken by usual handling.

It is one of the characteristics of the soft contact lenses according to the present invention that the lenses are less affected by pH. The pH of tears of a human being varies according to individual, but is said to be 7.1 to 7.8. In the case of soft contact lenses which are liable to be affected by pH, therefore, change in their outside diameter of 0.3 to 0.4 mm occurs in some cases between pH 7.1 and pH 7.8. In such lenses, there is the possibility that their dimension before wear is changed after wear by the pH of the wearer's tears. However, the soft contact lenses according to the present invention show almost no change in the dimension between pH 7.1 and pH 7.8.

It is another characteristic of the lenses according to the present invention that the desired lenses can be effectively produced owing to their low degree of swelling caused by their low water content.

The following examples illustrate the present invention in more detail. In the examples, all parts and % are expressed by weight unless otherwise indicated.

EXAMPLE 1

To a mixture of 87.2 parts of ethylene glycol monomethacrylate, 0.5 part of ethylene glycol dimethacrylate, 0.3 part of methacrylic acid, 5 parts of methyl methacrylate, 5 parts of butyl methacrylate and 2 parts of vinyl acetate was added diisopropyl peroxydicarbonate. The mixture was stirred thoroughly, poured into a mold and then subjected to polymerization in an electric furnace which could be heated continuously from 35° C. to 110° C. After the completion of the polymerization, the polymer was released from the mold and processed into a lens by carrying out the usual cutting, grinding and polishing. The resulting hard lens was then treated in normal saline solution containing 1% of sodium hydrogen carbonate at 80° to 90° C. for one hour, and treated in normal saline solution at 80° to 90° C. for one hour. The soft contact lens thus obtained had a water content of 36%, a tensile strength of about 600 g/mm$^2$ and good optical properties.

EXAMPLE 2

To a mixture of 87.5 parts of ethylene glycol monomethacrylate, 1 part of ethylene glycol dimethacrylate, 1.5 parts of methacrylic acid and 10 parts of n-butyl methacrylate was added azobisisobutyronitrile. In the same manner as in Example 1, a base material for soft contact lenses was produced and then processed. The soft contact lens thus obtained had a water content of 40% and a tensile strength of about 500 g/mm$^2$.

EXAMPLE 3

To a mixture of 86.7 parts of ethylene glycol monomethacrylate, 0.3 part of methacrylic acid, 10 parts of methyl methacrylate and 3 parts of ethyl methacrylate was added bis-4-tert-butylcyclohexyl peroxydicarbonate. The mixture was polymerized by the continuous temperature increasing method. The polymer was processed into a lens. The resulting hard lens was subjected to hydration treatment at room temperature. The soft contact lens thus obtained had a water content of 33% and a tensile strength of more than 600 g/mm$^2$.

EXAMPLE 4

A mixture of 87 parts of ethylene glycol monomethacrylate, 5 parts of ethyl methacrylate, 3 parts of n-butyl methacrylate and 5 parts of vinyl acetate was polymerized. The resulting polymer was processed into a lens. The resulting hard lens was subjected to hydration treatment by immersing in normal saline solution at room temperature. The soft contact lens thus obtained had a high strength and excellent optical properties and was stable to a thermal change and an external change.

What is claimed is:

1. A soft contact lens swelled by hydration treatment having a water content of 20 to 45% and a tensile strength of at least 500 g/mm$^2$ and consisting of a copolymer of 70 to 90% by weight of an alkylene glycol monomethacrylate, 0 to 2% by weight of a polyfunctional monomer as a crosslinking agent, 0 to 5% by weight of an unsaturated carboxylic acid containing at least one carboxyl group in its molecule, 2 to 25% by weight of a methacrylic acid ester and 0 to 10% by weight of a vinyl monomer.

2. A soft contact lens according to claim 1, wherein said alkylene glycol monomethacrylate is selected from the group consisting of monomethacrylates of ethylene glycol, propylene glycol, diethylene glycol, tetraethylene glycol and polyethylene glycol of the formula, $$HO(CH_2CH_2O)_nH$$

wherein n is 5 to 1000.

3. A soft contact lens according to claim 1, wherein said polyfunctional monomer is selected from the group consisting of ethylene glycol dimethacrylate, diethylene glycol dimethacrylate, triethylene glycol dimethacrylate, tetraethylene glycol dimethacrylate, polyethylene glycol dimethacrylate of the formula, $$CH_2=C-CO(CH_2-CH_2-O)_n-C-C=CH_2$$
$$\underset{CH_3}{|} \qquad \qquad \underset{CH_3}{|}$$

wherein n is 5 to 23, butylene glycol dimethacrylate, neopentyl glycol dimethacrylate, propylene glycol dimethacrylate and diethylene glycol bisallylcarbonate.

4. A soft contact lens according to claim 1, wherein said unsaturated carboxylic acid containing at least one carboxyl group in its molecule is selected from the group consisting of acrylic acid, methacrylic acid and itaconic acid.

5. A soft contact lens according to claim 1, wherein said methacrylic acid ester is selected from the group consisting of methyl methacrylate, ethyl methacrylate, n-propyl methacrylate, n-butyl methacrylate and n-hexyl methacrylate.

6. A soft contact lens according to claim 1, wherein said vinyl monomer is vinyl acetate.

7. A soft contact lens according to claim 1, wherein said copolymer comprises at least 0.5% by weight of said polyfunctional monomer.

8. A soft contact lens according to claim 1, wherein said copolymer comprises at least 0.3% by weight of said unsaturated carboxylic acid.

9. A soft contact lens according to claim 1, wherein said copolymer comprises at least 2% by weight of said vinyl monomer.

10. A soft contact lens according to claim 1, wherein said copolymer comprises at least 0.5% by weight of said polyfunctional monomer, at least 0.3% by weight of said unsaturated carboxylic acid and at least 2% by weight of said vinyl monomer.

11. A soft contact lens according to claim 1, wherein said copolymer comprises at least 1% by weight of said polyfunctional monomer and at least 1.5% by weight of said unsaturated carboxylic acid.

12. A soft contact lens according to claim 1, wherein said copolymer comprises at least 5% by weight of said vinyl monomer.

13. A process for producing a soft contact lens which comprises pouring into a mold a composition comprising 70 to 90% by weight of an alkylene glycol monomethacrylate, 0 to 2% by weight of a polyfunctional monomer as a crosslinking agent, 0 to 5% by weight of an unsaturated carboxylic acid containing at least one carboxyl group in its molecule, 2 to 25% by weight of a methacrylic acid ester and 0 to 10% by weight of a vinyl monomer, raising the temperature of the composition from 35° C. to 110° C. continuously to effect polymerization, processing the resulting polymer into a lens, and then swelling the lens thus obtained by hydration treatment.

14. A process according to claim 13, wherein a radical polymerization catalyst is added to said composition.

15. A process according to claim 14, wherein said radical polymerization catalyst is selected from the group consisting of benzoyl peroxide, lauroyl peroxide, cumene hydroperoxide, di-tert-butyl peroxide, bis-4-tert-butylcyclohexyl peroxydicarbonate, diisopropyl peroxydicarbonate, and azobisisobutyronitrile.

16. A process according to claim 13, wherein said hydration treatment is carried out by immersing the resulting hard lens in normal saline solution containing an alkali metal salt at room temperature or with heating and then immersing in normal saline solution several times.

17. A process according to claim 13, wherein said hydration treatment is carried out by immersing the resulting hard lens in normal saline solution, immersing in normal saline solution containing an alkali metal salt, and then immersing in normal saline solution several times.

18. A process according to claim 13, wherein said hydration treatment is carried out by immersing the resulting hard lens in normal saline solution several times.

19. A process according to claim 16, wherein said alkali metal salt is selected from the group consisting of sodium carbonate, potassium carbonate, lithium carbonate, sodium hydrogen carbonate and potassium hydrogen carbonate.

20. A process according to claim 17, wherein said alkali metal salt is selected from the group consisting of sodium carbonate, potassium carbonate, lithium carbonate, sodium hydrogen carbonate and potassium hydrogen carbonate.

21. The product prepared by the process of claim 13.

22. A process according to claim 13, wherein said composition comprises at least 0.5% by weight of said polyfunctional monomer.

23. The product prepared by the process of claim 22.

24. A process according to claim 13, wherein said composition comprises at least 0.3% by weight of said unsaturated carboxylic acid.

25. The product prepared by the process of claim 24.

26. A process according to claim 13, wherein said composition comprises at least 2% by weight of said vinyl monomer.

27. The product prepared by the process of claim 26.

28. A process according to claim 13, wherein said composition comprises at least 0.5% by weight of said polyfunctional monomer, at least 0.3% by weight of said unsaturated carboxylic acid and at least 2% by weight of said vinyl monomer.

29. The product prepared by the process of claim 28.

30. A process according to claim 13, wherein said composition comprises at least 1% by weight of said polyfunctional monomer and at least 1.5% by weight of said unsaturated carboxylic acid.

31. The product prepared by the process of claim 30.

* * * * *